(12) United States Patent
Nagata et al.

(10) Patent No.: US 8,712,589 B2
(45) Date of Patent: Apr. 29, 2014

(54) SYSTEM AND METHOD FOR JUDGING SUCCESS OR FAILURE OF WORK OF ROBOT

(75) Inventors: Hideo Nagata, Fukuoka (JP); Yasuyuki Inoue, Fukuoka (JP); Yosuke Kamiya, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 663 days.

(21) Appl. No.: 13/042,478

(22) Filed: Mar. 8, 2011

(65) Prior Publication Data

US 2011/0270444 A1    Nov. 3, 2011

(30) Foreign Application Priority Data

Apr. 28, 2010 (JP) ................................. 2010-102822

(51) Int. Cl.
*G05B 15/00* (2006.01)
*G05B 19/18* (2006.01)

(52) U.S. Cl.
USPC ............ 700/258; 700/245; 700/250; 700/252

(58) Field of Classification Search
USPC .................. 700/245, 258, 250, 252, 260, 262; 324/207.25, 76.12; 375/240.12, E7.14, 375/E7.144
See application file for complete search history.

(56) References Cited

U.S. PATENT DOCUMENTS

| | | | |
|---|---|---|---|
| 5,955,879 A * | 9/1999 | Durdle et al. | ............ 324/207.17 |
| 6,141,863 A | 11/2000 | Hara et al. | |
| 6,553,321 B2 | 4/2003 | Siegel et al. | |
| 6,593,729 B2 * | 7/2003 | Sundin | ...................... 324/207.16 |
| 2006/0147195 A1 * | 7/2006 | Lim et al. | ...................... 396/427 |

FOREIGN PATENT DOCUMENTS

| | | |
|---|---|---|
| JP | 60-25696 | 2/1985 |
| JP | 08-174459 | 7/1996 |
| JP | 09-123078 | 5/1997 |
| JP | 2003-159620 | 6/2003 |
| WO | WO 98/17444 | 4/1998 |

OTHER PUBLICATIONS

Japanese Office Action for corresponding JP Application No. 2010-102822, Jul. 11, 2012.

* cited by examiner

*Primary Examiner* — Ian Jen
(74) *Attorney, Agent, or Firm* — Ditthavong Mori & Steiner, P.C.

(57) ABSTRACT

A system for judging success or failure of a work of a robot includes a position command generating unit, a contact position detecting unit, and a work success/failure judging unit. The position command generating unit generates a position command enabling movement of a fingertip of the robot so that a position and posture detecting unit, which is attached to the fingertip of the robot and has an elastic transformation area, is brought into contact with a predetermined position relating to a work target after the predetermined work is performed for the work target by the robot. The contact position detecting unit calculates a contact position that is a position of a tip end of the position and posture detecting unit at the time of being in contact with the predetermined position based on a value of an external force applied to the fingertip and the position of the tip end of the position and posture detecting unit. The work success/failure judging unit judges the predetermined work to be successful when the calculated contact position is within a predetermined range and judges the predetermined work to be failed when the calculated contact position is not within the predetermined range.

10 Claims, 5 Drawing Sheets

SYSTEM AND METHOD FOR JUDGING SUCCESS OR FAILURE OF WORK OF ROBOT

CROSS-REFERENCE TO RELATED APPLICATION

This application is based upon and claims the benefit of priority of the prior Japanese Patent Application No. 2010-102822, filed on Apr. 28, 2010, the entire contents of all of which are incorporated herein by reference.

FIELD

The embodiment discussed herein is directed to a system for and a method of judging success or failure of a work of a robot.

BACKGROUND

When assembly or fitting is automated by employing a working robot, there are cases where the robot judges the success or failure of the work after completion of the work.

Conventional methods of checking the state of a work target can be classified into a method of checking after the completion of a work and a method of checking during a work. As the method of checking after the completion of a work, there is a method of checking a work target in a non-contacting manner by using a three dimensional visual sensor (for example, International Publication Pamphlet No. WO 98/17444).

In addition, there is a method in which, after the completion of assembling, a work target is gripped with a hand once again by performing an assembling action, and force sense information obtained during the process is compared with force sense information obtained at the time of success (for example, Japanese Laid-Open Patent Publication No. 08-174459).

As the method of checking during a work, there is a method of judging success or failure by detecting an impact sound at the time of fitting by making use of a microphone rather than the force sense information (for example, Japanese Laid-Open Patent Publication No. 09-123078).

However, according to the conventional methods, the judging of success or failure of a work may not be successfully achieved without being influenced by surroundings, a variation in individual works, and the placement of a latch, and nearly without disturbing the work.

SUMMARY

A system for judging success or failure of a work of a robot according to an aspect of an embodiment includes a position command generating unit, a contact position detecting unit, and a work success/failure judging unit. The position command generating unit generates a position command enabling movement of a fingertip of the robot so that a position and posture detecting unit, which is attached to the fingertip of the robot and has an elastic transformation area, is brought into contact with a predetermined position relating to a work target after the predetermined work is performed for the work target by the robot. The contact position detecting unit calculates a contact position that is a position of a tip end of the position and posture detecting unit at the time of being in contact with the predetermined position based on a value of an external force applied to the fingertip and the position of the tip end of the position and posture detecting unit. The work success/failure judging unit judges the predetermined work to be successful when the calculated contact position is within a predetermined range and judges the predetermined work to be failed when the calculated contact position is not within the predetermined range.

DESCRIPTION OF EMBODIMENT

Figure 1:
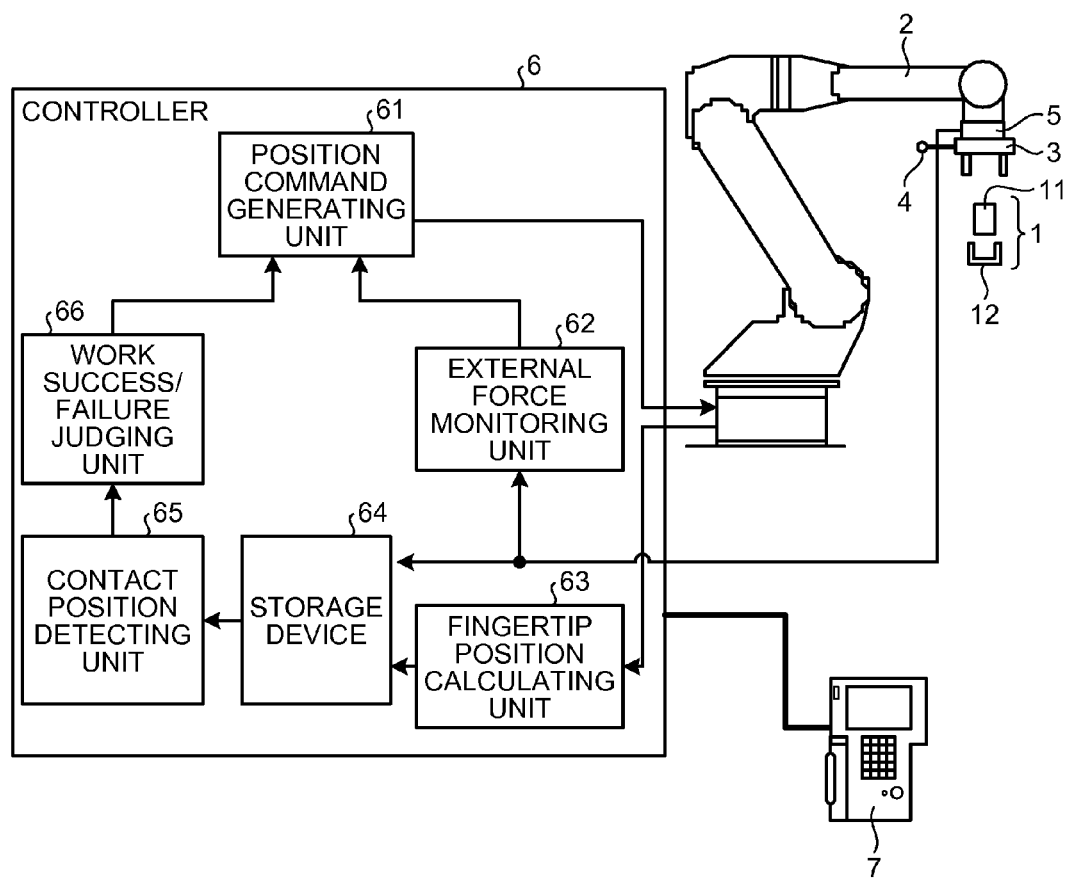
FIG. 1 is a configuration diagram of a robot system that implements a system for or a method of judging success or failure of a work according to one embodiment.

The system for judging success or failure of a work of a robot according to one embodiment includes a position command generating unit, a contact position detecting unit, and a work success/failure judging unit. The position command generating unit generates a position command enabling movement of a fingertip of the robot so that a position and posture detecting unit, which is attached to the fingertip of the robot and has an elastically transformable area, may be brought into contact with a predetermined position relating to a work target after the robot completes a predetermined work on the work target. The contact position detecting unit calculates a contact position that is the position of the electrically transformable area and the position of the tip end of the position and posture detecting unit when the tip end is in contact with a predetermined position, based on the value of an external force applied to the fingertip and based on the tip end position of the position and posture detecting unit. The work success/failure judging unit judges the predetermined work to be successful when the calculated contact position is within a predetermined range and judges the predetermined work to be unsuccessful when the calculated contact position is not within the predetermined range.

The position and posture detecting unit may be configured so as to be elastically transformable in at least one direction out of three directions including a direction toward the tip end and two directions other than the former direction, from the position of the fingertip of the robot. In addition, the position and posture detecting unit may be configured so as to be detachable from the fingertip of the robot and have a tip end portion having a sphere shape.

The contact position detecting unit may calculate the tip end position at the time point of the rising of an external force as the above-described contact position, based on time-series data of the value of the external force and the tip end position.

The work success/failure judging unit may be configured so as to judge success or failure of the work based on whether a difference between an ideal contact position, which is known in advance, and the calculated contact position is within a predetermined threshold value.

In addition, in a system for judging success or failure of a work of a robot according to an embodiment, the number of the above-described predetermined positions relating to the work target may be set to at least two. In such a case, the work success/failure judging unit may judge success or failure of the work based on whether relative positional relationship between a contact position calculated for one of the at least two predetermined positions and a contact position calculated for the other one is within predetermined positional relationship.

In addition, the work success/failure judging system may further include an external force monitoring unit that monitors the value of the external force and transmits a signal indicating detection of a contact to the position command generating unit in a case where the value of the external force exceeds a predetermined threshold value. The position command generating unit may be configured so as to generate a position command used for decelerating or stopping the robot in response to the reception of the above-described signal.

The system for judging success or failure of a work may further include a fingertip position calculating unit that calculates the position of the fingertip of the robot by sequentially convert the values from encoders installed to the respective shafts of the robot, obtains the center position of the sphere-shaped tip end portion of the position and posture detecting unit by adding the dimension of the position and posture detecting unit to the calculated position of the fingertip, and calculates the tip end position by adding the radius of the tip end portion to the center position in accordance with the approach direction of the position and posture detecting unit with respect to the predetermined position.

In addition, in a method of judging success or failure of a work according to an embodiment, after a predetermined work is performed on the work target by the robot, generated is a position command enabling the movement of the fingertip of the robot so that the position and posture detecting unit, which is attached to the fingertip of the robot and has an elastically transformable area, may be brought into contact with a predetermined position relating to the work target. Then, in the method of judging success or failure of a work according to the embodiment, the position of the tip end (contact position) of the position and posture detecting unit at the time of being brought into contact with the predetermined position is calculated based on the value of the external force applied to the fingertip of the robot and based on the position of the tip end of the position and posture detecting unit. Then, in the method of judging success or failure of a work according to the embodiment, it is judged that the predetermined work is successful when the calculated contact position is within a predetermined range and that the predetermined work is unsuccessful when the calculated contact position is not within the predetermined range.

Figure 5A:
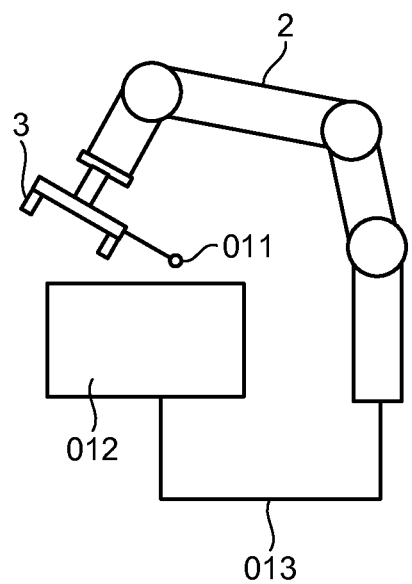
FIGS. 5A to 5D are diagrams illustrating examples of a detector for detecting the position and the posture of a work target that can be used in the embodiment.
Figure 5B:
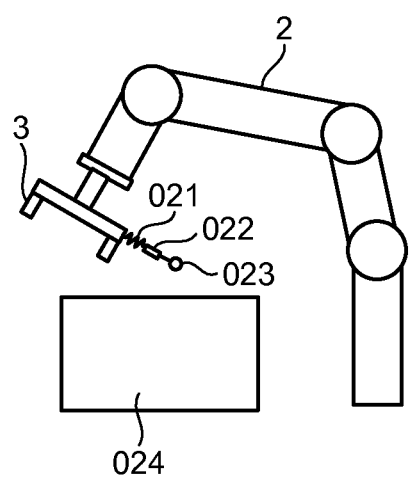
Figure 5C:
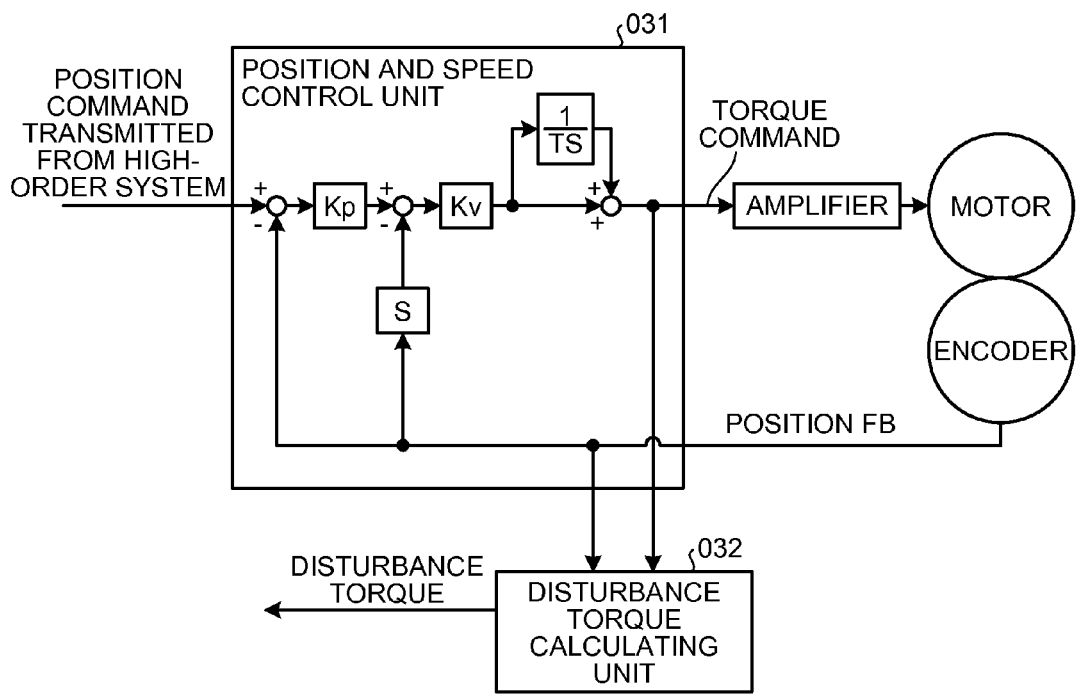
Figure 5D:
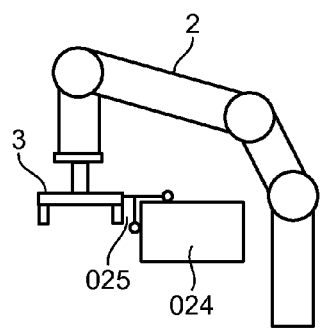

Although the "position and posture detecting unit" corresponds to a contact position detecting probe 4 of the embodiment, it is not limited thereto. The "position and posture detecting unit" may be developed further in the future. Examples of the position and posture detecting unit include, for example in a broad sense, a unit that uses a two-dimensional or three-dimensional contact state detecting unit as illustrated in FIG. 5D. In addition, the "position and posture detecting unit" includes a conduction-type detection unit as illustrated in FIG. 5A, a contact-sensor-type detection unit as illustrated in FIG. 5B, and a disturbance-observer-type detection unit as illustrated in FIG. 5C. In addition, the "position and posture detecting unit" is not limited to the observer-type illustrated in FIG. 5C. The examples may further include an "observer" of another type that takes a change in the position and/or the posture as a change in the internal "state" of the system and a "Kalman filter" in which the effects of noise are taken into account. Here, the "disturbance observer" refers to a technique or a device for estimating the internal state of a system based on the value of an input signal, which is input to a predetermined system, and the value of an output signal, which is output from the predetermined system. For example, in the case of the example illustrated in FIG. 5C, the "disturbance observer" refers to a technique or a device for estimating the state of a contact with an object other than the system as a disturbance impinging to the internal part of the system (for example, an "encoder") based on physical amounts, which can be acquired from the outside of the system, such as a "position command from a high-order system," a "torque command," or a "position feedback (FB)." Here, a "Kalman filter" refers to a technique or a device for estimating the internal state of a system based on the value of an input signal, which is input to a predetermined system, and the value of an output signal, which is output from the predetermined system, taking the influence of noise, which cannot be considered in some types of disturbance observers, into consideration.

According to the configuration of using a two-dimensional or three-dimensional position and posture detecting unit as illustrated in FIG. 5D as an example, and in particular of using a flexible two-dimensional position and posture detecting unit, the state of "fitting" in a predetermined shape of a work target is detected, and the position and the posture can be detected through the detection operation.

The "position and posture detecting unit" includes a "contact state detecting unit" as a subordinate concept thereof. Examples of the "contact state detecting unit," includes a contact position detecting probe 4 illustrated in FIG. 1, a conduction detecting probe 011 illustrated in FIG. 5A, and a rigid probe 023 illustrated in FIG. 5B, a unit using a Kalman filter illustrated in FIG. 5C, a contact state detecting unit having flexibility illustrated in FIG. 5D, and the like.

Here, the "work target" may include not only a target (referred to as an "work target"), on which a work is actually performed, but also an object, that is fixed to part of the work target for the purpose of helping detection of the position an posture in the embodiment. Alternatively, the "work target" may include an object that is known, to the robot, to have a predetermined positional relationship and a predetermined posture relationship with the work target with the target object and that can be used for detecting the position and the posture.

Hereinafter, a system for judging success or failure of a work of a robot and a method of judging success or failure of a work of a robot according to an embodiment disclosed here will be described in detail with reference to the accompanying drawings.

FIG. 1 is an example of the configuration of a robot system that implements a system for or a method of judging success or failure of a work according to this embodiment. A work target set 1 illustrated in FIG. 1 includes a work target 11 that is gripped and assembled by a robot 2 and a work target 12 (as the opponent) together which the work target 11 is assembled. Here, the "work target" refers to an object that is a target for a work such as welding, processing, or gripping performed by an end effector. In this example, as the work target 11 is appropriately assembled together with the work target 12, the work target set 1 is in a desirable state, and a normal work is completed. Here, the entire work target set 1 may be referred to as a "work target."

The robot 2 moves the end effector 3 to an arbitrary position. The end effector 3 is attached to the fingertip of the robot 2 and performs some kinds of works on the work target. The end effector 3 may have various configurations determined depending on the use, such as a hand (gripper) that grips an object, a grinder that performs trimming or the like. In this embodiment, as an example, the end effector 3 is configured as a gripper that grips a work target 11.

A contact position detecting probe 4 serves as a position and posture detecting unit and can be detached from the end effector 3. The contact position detecting probe 4 includes an area having a property of being elastically transformed in at least one direction of three directions including a direction from a position, at which the contact position detecting probe 4 is fixed to the end effector 3, toward the tip end and two bending directions other than the direction toward the tip end. The contact position detecting probe 4 has such a length that the end effector 3 or the robot 2 and the work target do not interfere with each other when the contact position detecting probe 4 is brought into contact with the work target 11 or 12 during a position detecting operation. In order to calculate the contact position by using the same technique regardless of the direction of contact, the tip end of the contact position detecting probe 4 may have a sphere shape. In addition, in order not to degrade the workability of the robot 2, the contact position detecting probe 4 may be a storage-type probe that is configured so as to protrude from the end effector 3 only when the position detecting operation is performed.

An external force detector 5, for example, is a force sensor detecting a force in one or more directions that is applied to the end effector 3 in accordance with the operation of the robot 2. Besides such a configuration, the external force detector 5 may be configured as a sensor that electrically detects a contact state through conduction, a contact sensor, a thin-type pressure sensor, or a force detector that detects a calculated value of disturbance toque represented as a difference between a torque command value for a motor of each shaft of the robot 2 and load torque. In this embodiment, a case where the external force detector 5 is a force sensor will be described as an example. In the case where the external force detector 5 is a force sensor, the value of the force sensor may be detected every predetermined period. In addition, in a case where the external force detector 5 is a force detector that detects a calculated value of the disturbance torque, the calculated value of the disturbance torque may be detected every predetermined period.

As illustrated in FIG. 1, inside a robot controller 6, several constituent elements are arranged. A position command generating unit 61 controls the position of the robot 2. An external force monitoring unit 62 judges a contact by monitoring the values from the external force detector 5 and the like. A fingertip position calculating unit 63 calculates the position of the tip end of the probe based on the values from the encoders (sensors used to measure the positions (rotation angles) of the respective motors) mounted in respective shafts of the robot 2, a design value of the probe, the installation position of the probe, the approach direction, and the like. A recording device 64 records the value from the external force detector 5 during the position detecting operation and the position of the tip end of the probe that is acquired by the fingertip position calculating unit 63. The contact position detecting unit 65 calculates the contact position and the contact posture based on the recorded values and provides a work success/failure judging unit 66 with data relating to the contact position and the contact posture that have been calculated. The work success/failure judging unit 66 judges success or failure of a work by measuring a plurality of contact positions or the like based on the contact position and the contact posture (hereinafter, briefly referred to as "contact position and the like") for specific positions of the work targets 11 and 12 that are set in advance.

The value of the external force detector 5 during the position detecting operation is also supplied to the external force monitoring unit 62. The external force monitoring unit 62 judges whether or not a contact occurs based on this data and transmits the data relating to the result of the judgment to the position command generating unit 61 that controls the position of the robot 2.

The position command generating unit 61 generates a position command to be given to the motor mounted in each shaft of the robot 2 and can reflect the result of the judgment made by the work success/failure judging unit 66 on the position command. For example, when a work configured by a plurality of processes is performed, and then the result of the judgment indicating the success of a process is received from the work success/failure judging unit 66, the position command generating unit 61 generates a position command used to perform the work of the following process. On the other hand, when the result of the judgment indicating the failure of a process is received from the work success/failure judging unit 66, for example, the position command generating unit 61 generates a position command used to retry the work of the failed process instead of generating a position command used to perform the work of the following process. In addition, the position command generating unit 61 can generate a position command (a movement stop command or a retreating movement command) based on a contact detection signal transmitted from the external force monitoring unit 62. Accordingly, for example, a control signal that is necessary to avoid a collision or the like can be provided.

In FIG. 1, although the position command generating unit 61, the external force monitoring unit 62, the fingertip position calculating unit 63, the recording device 64, the contact position detecting unit 65, and the work success/failure judging unit 66 are disposed inside the single the robot controller 6, these constituent elements may be disposed so as to be distributed in two or more places. In addition, the constituent elements do not need to be configured as discrete elements as illustrated in FIG. 1. Furthermore, a constituent element having a function corresponding to the functions of a plurality of constituent elements of the constituent elements may be disposed inside the robot controller 6.

FIGS. 5A to 5D illustrate examples of a probe that can be used to detect the contact position and the like in this embodiment.

FIG. 5A illustrates an example of a conduction detecting probe configured by a sensor that electrically detects a contact through electrical conduction. A robot (a manipulation unit) 2 and a work target 012 are electrically connected to each other via an electrical coupling line 013. By bringing the conduction detecting probe 011 installed to an end effector 3 into contact with a work target 012, the probe is electrically conducted by using the work target 012 as a medium, and the conduction detecting probe 011 can detect the contact by detecting the conduction.

FIG. 5B illustrates an example of a rigid probe 023 that is configured by a contact sensor. A switch 022 is arranged in the end effector 3 with an elastic member 021 disposed therebetween, and the rigid probe 023 is installed in front of the switch 022. The switch 022 outputs an electric signal when a predetermined amount of displacement occurs due to a physical restraint. When the rigid probe 023 is brought into contact with a work target 024 due to the operation of the robot 2, and a predetermined amount of displacement occurs, the contact can be detected based on an output of an electric signal used for indicating detection of the contact from the switch 022.

FIG. 5C is a block diagram illustrating a method of detecting a force using disturbance torque that is represented by a difference between a torque command value and load torque. According to the method of detecting a force illustrated in FIG. 5C, disturbance torque is calculated by an disturbance torque calculating unit 032 with the use of the torque command and the position feedback (FB) of a position/speed control unit 031 of a general robot. As a method of calculating the disturbance torque, for example, there is a method in which torque is calculated by acquiring angular acceleration based on the second-order differential of the position feedback and multiplying the angular acceleration by inertial moment, and a difference between the torque command and the torque calculated based on the position feedback is determined as the disturbance torque. However, the method of calculating the disturbance torque is not limited thereto. Thus, by calculating the disturbance torque with a predetermined period, a contact can be detected.

FIG. 5D illustrates an example of a contact state detecting unit 025 that two-dimensionally or three-dimensionally detects the position and the posture. The contact state detecting unit 025 has a plurality of tip end portions having flexibility. When the plurality of tip end portions is fitted to a work target 024 having a predetermined shape, the contact state detecting unit 025 can detect a contact.

In a case where the designed dimension, the attachment position, the approach direction, and the like of the position and posture detecting unit (for example, the contact position detecting probe 4 illustrated in FIG. 1) are not precisely known, an additional adjustment process may be performed. An operation pendant 7 is used for teaching a robot 2 a work, performing playback of a work, performing a position detecting operation, and setting and changing a detection threshold value of an external force detector (a force sensor) and the probe dimension. Here, the "teaching" refers to teaching a robot an operation for implementing a work by using a specific method so as to allow the robot to perform the work. As an example, an operator performs teaching in the procedures in which the operator moves each articulated shaft or the end effector 3 of the robot 2 to a desired place by pressing a keypad of the operation pendant 7 and records the moved place in a recording device 64 of the robot controller 6. At this time, a work program for allowing the robot controller 6 to perform the taught work may be stored in the storage device 64. In contrast, "playback" refers to that a robot performs an instructed work operation based on the stored information (a "work" may be used for describing the same concept).

Figure 2:
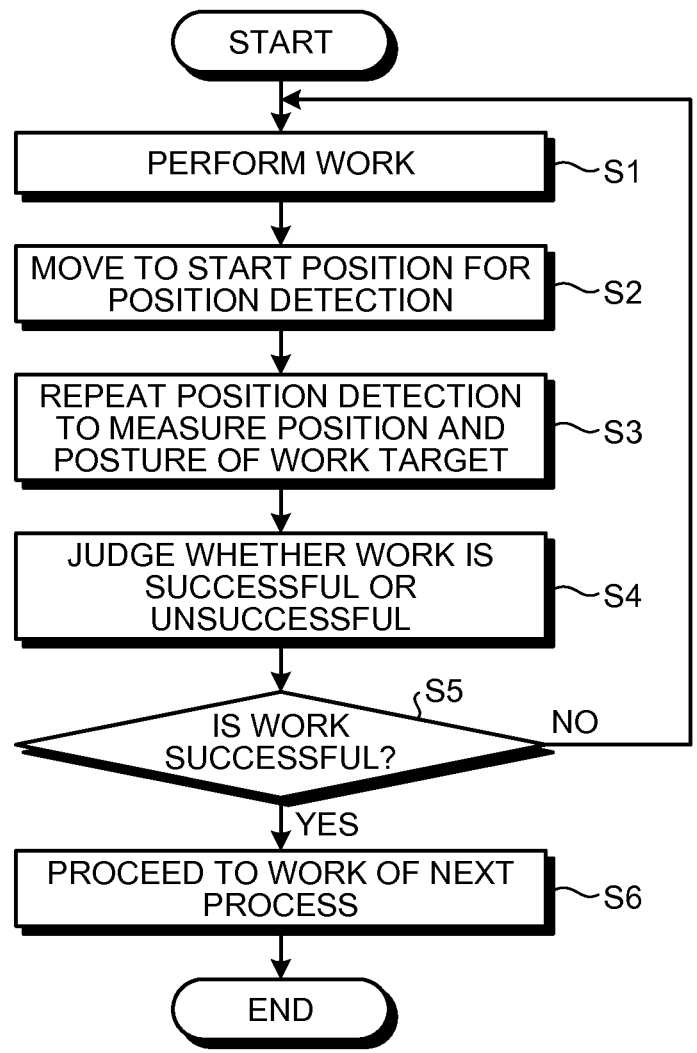
FIG. 2 is a flowchart illustrating the processing flow of the operation of the system for and the method of judging success or failure of a work according to the embodiment.

FIG. 2 is a flowchart illustrating the processing flow of the system for and the method of judging success or failure of a work according to this embodiment. The operation of the system for judging success or failure of a work or the method of judging success or failure of a work will be sequentially described with reference to this figure. Although this embodiment is described in two dimensions with reference to FIG. 3, it can be easily expanded to a three dimensional configuration.

In this embodiment, it is judged whether a work is successful or failed based on a plurality of contact positions for a work target on a robot coordinate system, which are measured after completion of the work of a robot, and the like. Particularly, here, it is assumed that the opponent work target (for example, the work target 12 illustrated in FIG. 1) is fixed so as to be at a predetermined position with respect to the robot, and the dimensions of the work target 11 and the work target 12 are known in advance. Here, the "robot coordinate system" is an orthogonal coordinate system fixed to a robot main body and is a coordinate system that is used as a reference when the robot is operated.

However, this embodiment is not performed only in the limited situation assumed as described above. As will be described below, even in a case where the opponent work target is not fixed or the dimension of the work target is unknown, the system for and the method of judging success or failure of a work according to this embodiment can be effectively performed.

In step S1, the robot controller 6 performs a predetermined work by performing a playback of a work that is taught in advance and is stored in the storage device 64. For example, the controller 6 may allow the robot 2 to playback a predetermined work by executing a work program that is stored in the storage device 64 as a result of a teaching operation performed in advance.

Various operations can be performed in step S1 in accordance with the intended use of the robot 2. For example, in a case where the robot 2 is used so as to fit a work target 11 (a predetermined cable terminal) into a work target 12 (for example, a substrate having a fitting portion that is appropriate for the predetermined cable terminal) as illustrated in FIG. 1, the robot 2 performs an operation of allowing the end effector 3 to grip the work target 11 and fit the work target 11 into the opponent work target 12 by playing back the work program that is taught in advance.

Next, in step S2, the robot controller 6 generates, by using the position command generating unit 61, a position command, which is used to remove the fingertip of the robot 2 to a position detection starting position used to judge success or failure of a work that is taught in advance, that is, to an approach position before a contact. Further, in step S2, the robot controller 6 moves the fingertip of the robot 2 to the position detection starting position that has been taught. In addition, the position detection starting position for judging success or failure of a work, which has been taught in advance, may be stored in the storage device 64 when performing a teaching operation.

Figure 3:
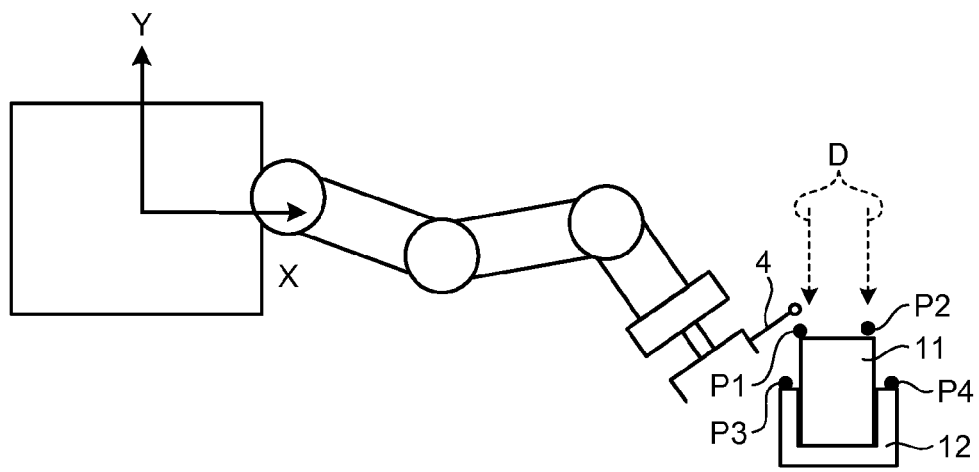
FIG. 3 is an explanatory diagram illustrating the operation of a robot when the judging of success or failure of a work according to this embodiment is performed.

In step S3, the contact position and the like are measured by performing a position detecting operation for the work target 11 using the contact position detecting probe 4. In this embodiment, the detection positions P1 R [x1, y1] and P2 R[x2, y2] illustrated in FIG. 3 are acquired by repeating a series of operations of steps S2 and S3 twice. Here, P1 R [x1, y1] represents the XY coordinates of the point P1 on a robot coordinate system. The position of the tip end of the contact position detecting probe 4 is acquired by acquiring the center position PTCP R [xtcp ytcp] of the probe sphere by adding the dimension of the probe to the position of the fingertip of the robot 2 that is calculated by sequentially transforming the values from the encoders installed to the respective axes of the robot 2 using the fingertip position calculating unit 63 and adding the radius R of the probe sphere to the center position. As illustrated in the following Equation (1), the position of the tip end of the contact position detecting probe 4 can be acquired in accordance with the approach direction (four directions) of the probe in the position detecting operation. In Equation (1), the X axis and the Y axis represent the X-axis and the Y-axis illustrated in FIG. 3. In the example of the detection operation illustrated in FIG. 3, the contact position detecting probe 4 approaches the point P1 on the work target 11 in the direction D from the positive side to the negative side of the Y-axis and this corresponds to the case of (iv) in Equation (1).

Equation (1)

$$^R[x1\ y1] = ^R[x_{tcp}\ y_{tcp}] + [R\ 0]$$ (i)

(in the case of the approach from the negative side to the positive side of the X-axis)

$$^R[x1\ y1] = {^R[x_{tcp}\ y_{tcp}]} + [-R\ 0] \quad \text{(ii)}$$

(in the case of the approach from the positive side to the negative side of the X-axis)

$$^R[x1\ y1] = {^R[x_{tcp}\ y_{tcp}]} + [0\ R] \quad \text{(iii)}$$

(in the case of the approach from the negative side to the positive side of the Y-axis)

$$^R[x1\ y1] = {^R[x_{tcp}\ y_{tcp}]} + [0\ -R] \quad \text{(iv)}$$

(in the case of the approach from the positive side to the negative side of the Y-axis)

According to Equation (1), x1 and y1 of the point P1 illustrated in FIG. 3 are acquired. Similarly, x2 and y2 of the point P2 can be acquired as well. In this embodiment, although the detection positions are two points including the points P1 and P2, the number of the detection positions can be arbitrarily set in accordance with the accuracy required for the work or the like. For example, the position detection may be performed for the points P3 and P4 located on the opponent work target 12 as illustrated in FIG. 3, in addition to the points P1 and P2 located on the work target 11. In such case, x3 and y3 of the point P3 and x4 and y4 of the point P4 can be acquired by using the same method.

The center position PTCP R [xtcp ytcp] on the robot coordinate system (for example, the XY coordinate system illustrated in FIG. 3) can be acquired based on the values of the encoders of the robot 2, the designed dimension and the installation position of the probe. However, when the radius R of the probe is several hundreds of micrometers, the center position of the probe sphere may be regarded as the position of the tip end of the probe.

The position detecting operation is performed in the procedures in which the operator teaches the robot the position at which the work target is in contact, through a jog operation by making use of the operation pendant 7 and the work is played back. Here, the "jog operation" is an operation that is mainly performed when teaching is performed and, for example, refers to an operation in which a predetermined shaft is operated only during the time while each shaft operation button disposed on the operation pendant is pressed by the operator, and the shaft is stopped when the shaft operation button is released. The taught position (a position detection ending position, that is, a position located inside the work at which the contacting probe arrives in a bent state) is, for example, a position acquired by brining the end effector 3 of the robot 2 near the work target 11, bringing the flexible contact position detecting probe 4, which is mounted in the end effector 3 so as to have no interference with the work target 11, into contact with the upper face of the work target 11, and further pressing the contact position detecting probe 4 by a predetermined distance (for example, several millimeters within the elastic area of the probe). The above-described predetermined distance from the position at which the probe is brought into contact with the work target to the pressed position is a distance that is absorbed by the flexibility of the probe. In order to play back the position detecting operation, a contact position detection signal may be transmitted to the robot controller 6 before the probe arrives at the pressed position. In such a case, the robot is decelerated and stopped, and a retreating process is performed. Here, the target of the position detection is not limited to the main body of the work target and may be any object relating to the work target and may be an object such as a jig, a desk, a surrounding wall, or a shelf that supports the work target and, for example, may be an object that does not move, or is not deformed or damaged by the application of a force of several hundreds of grams.

During the position detecting operation, the external force monitoring unit 62 simultaneously performs a process of monitoring whether the value of the force sensor exceeds the detection threshold value with a predetermined period and a process of recording the position of the tip end of the probe and the value of the force sensor in the recording device 64. Here, the process of monitoring whether the value of the force sensor exceeds the detection threshold value with a predetermined period and the process of recording the position of the tip end of the probe and the value of the force sensor in the recording device 64 do not need to be simultaneously performed.

When the value of the force sensor exceeds the detection threshold value, the external force monitoring unit 62 determines detection of a contact, a contact position detection signal is transmitted to the position command generating unit 61, and the robot controller 6 generates a position command used to decelerate and stop the robot 2 by making use of the position command generating unit 61. Accordingly, the robot 2 is decelerated and stopped. Furthermore, the robot controller 6 performs the predetermined position command transmitted from the position command generating unit 61 so as to retreat the robot 2 to the approach starting position (a start position of the position detecting operation).

Figure 4:
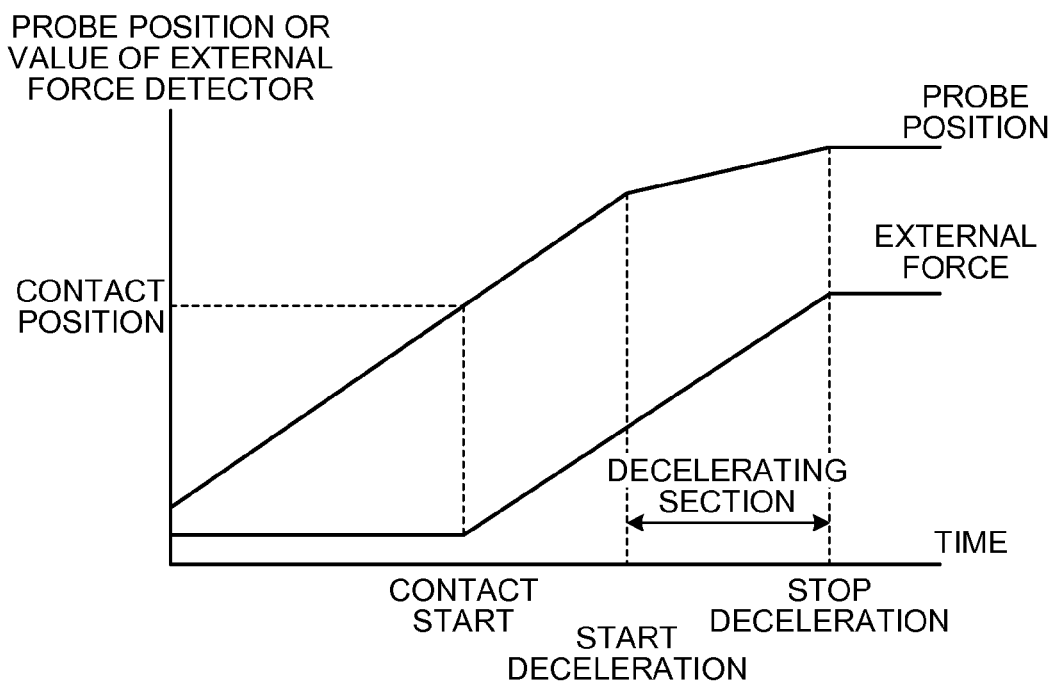
FIG. 4 is a graph illustrating storage data according to the embodiment.

The robot controller 6 acquires, from the position of the tip end of the probe, the value of the force sensor during the operation which is recorded in the recording device 64 and acquires the starting time point of the rising of the value of the force sensor at the time of contact by making use of the contact position detecting unit 65, and calculates the position of the tip end of the probe at the rise time point as the contact position (FIG. 4). In other words, the contact position detecting unit 65 retrospectively determines a change in the value of the force sensor based on the time-series data recorded in the recording device 64. In addition, when the recording process is performed, a predetermined buffer area is arranged in the storage device 64, and data is overwritten therein as is needed at the time of recording.

In the position detecting operation, in a case where the probe arrives at the pressed position (in a case where the contact position detection signal is not received by the robot controller 6), error is feed-backed in the position detecting process, and the process proceeds back to step S1 (in the case of "No" in the judgment "is the work successful?" in FIG. 2). The case is considered such that incompletion of a work such as an assembly occurs or no parts as work targets remain.

In this embodiment, since the position of the opponent work target 12 is fixed so as not to be changed, an ideal detection position in a case where the work is successful is acquired, for example, based on the known dimension of the work target 11 in step S4. In this case, whether the work is successful or failed can be judged by comparing the ideal detection position and the detection position that is actually measured in step S3 and determining whether the actual detection position (or a difference between the ideal detection position and the actual detection position) is within a range or a threshold value that is set in advance. The range or the threshold value is a value that is arbitrarily determined based on various factors such as the accuracy required for a product obtained after completion of the work. Here, the technique for judging success or failure of the work in step S4 is not limited to the above-described method, and thus various methods known to those skilled in the art can be used.

In a case where the work is judged to be successful (in the case of "Yes" in the judging whether the work is successful, which is illustrated in FIG. 2), the robot controller 6 controls the robot 2 so as to proceed to the work of the next process in step S5. In a case where the work is judged to be failed (in the case of "No" in the judging whether the work is successful, which is illustrated in FIG. 2), the robot controller 6 may control the robot 2 so as to grip the work target 11 and retry the step S1 and the subsequent. Alternatively, the robot controller 6 may control the robot 2 so as to grip the work target 11 and place the work target 11 at another place, grip a new work target and retry step S1 and after that, and the like. Furthermore, the robot controller 6 may inform the outside of the occurrence of error by generating a warning sound or the like without allowing the robot 2 to retry the work.

In the judging method according to the above-described embodiment, since the opponent work target 12 is fixed and thus the position of the opponent work target 12 is not changed, whether the work is successful or failed is judged by detecting the position of the upper face of the work target 11 through a contact, measuring the absolute position with respect to the robot 2, and determining whether the position (or a difference between the measured position and the ideal position) is within a range or a threshold value that is set in advance. However, the place to be detected through a contact is not limited to the upper face of the work target. Thus, an arbitrary place that is appropriate in terms of the shape or the like of the work target can be set as a target for detection through a contact. In addition, in a case where the opponent work target 12 is positioned by a conveyer or the like, there are individual variations in the opponent work target 12 due to deformation influenced by processing heat, or the like, as illustrated in FIG. 3, the positions P3 and P4 located on the opponent work target 12 are also measured, and whether the work is successful or failed may be judged based on whether the relative positional relationship (for example, the distance and the direction between the point P1 and the point P3 or the distance and the direction between the point P2 and the point P4) is within the positional relationship set in advance.

In addition, in the judging method according to the above-described embodiment, although the ideal contact position and the like are acquired based on the dimension data of the work target 11 and are used for the judging operation, even in a case where the dimension of the work target 11 is unknown, whether the work is successful or failed can be judged by storing a correctly fitting position at the time of teaching in advance by detecting the work target through a contact using the contact position detecting probe 4 and determining whether or not the amount deviated from the position is within the threshold value set in advance.

In addition, in the above-described judging method, although error such as inclination is measured as well by measuring two positions in both ends of the upper face of the work target 11, in a case where the width of the work target 11 is small, the time required for the measurement can be decreased by measuring only one position.

As above, according to the system or method for judging success or failure of a work of this embodiment, whether a work is successful or failed can be judged based on a plurality of contact positions and the like that have been acquired by acquiring an external force applied to the flexible contact position detecting probe arranged in the end effector in accordance with the operation of the robot, calculating the position of the tip end of the probe based on the values of the encoders of the robot and the dimension of the probe, acquiring the position of the tip end of the probe at the time of a contact by storing the value of the external force and the position of the tip end of the probe until a contact occurs. Therefore, this embodiment is not influenced by the effects of the circumference environment, does not easily interfere the work, and is not easily influenced by individual variations in the work or placement of a latch.

In addition, according to this embodiment, compared to a conventional technology using a visual sensor such as a camera, whether a work is successful or failed can be judged in a speedy manner by detecting a contact position and the like using the flexible contact position detecting probe. In a case where whether a work is successful or failed is judged while a product is actually manufactured in an assembly line of a factory, not only the accuracy of the judgment but also the speed of the judgment is requested. Thus, according to this embodiment, whether a work is successful or failed can be judged for scenes more than those according to the conventional technology. In addition, since the probe used in this embodiment can be acquired at a price lower than a camera or the like according to a conventional technology, the cost required for judging whether a work is successful or failed can be reduced.

Furthermore, according to this embodiment, various members or parts do not need to be additionally prepared so as to judge whether a work is successful or failed. Accordingly, since the configuration of the entire system including the robot is simplified, both a work such as assembly and judging whether a work is successful or failed can be performed by using one set of a robot and a robot controller. In addition, since an adjustment operation with high precision is not necessary, the burden acquired when a system for judging success or failure of a work is introduced to an assembly line of a factory or the like can be reduced. Furthermore, since the length of the manufacturing line may be shortened, whether a work is successful or failed can be checked while the work is actually being performed.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. A system for judging success or failure of a work of a robot, the system comprising:
    a position command generating unit that generates a position command enabling movement of a fingertip of the robot so that a position and posture detecting unit, which is attached to the fingertip of the robot and has an elastic transformation area, is brought into contact with a predetermined position relating to a work target after the predetermined work is performed for the work target by the robot;
    a contact position detecting unit that calculates a contact position that is a position of a tip end of the position and posture detecting unit at the time of being in contact with the predetermined position based on a value of an external force applied to the fingertip and the position of the tip end of the position and posture detecting unit; and
    a work success/failure judging unit that judges the predetermined work to be successful when the calculated contact position is within a predetermined range and judges the predetermined work to be failed when the calculated contact position is not within the predetermined range.

2. The system according to claim 1,
    wherein the position and posture detecting unit is elastically transformed in at least one direction out of directions including a direction from an installation position at the fingertip toward the tip end and two directions other than the one direction.

3. The system according to claim 1,
wherein the position and posture detecting unit is configured to be detachable from the fingertip and has a sphere-shaped tip end portion.

4. The system according to claim 1,
wherein the contact position detecting unit calculates the position of the tip end at a time point when the external force rises as the contact position based on time-series data of the value of the external force and the position of the tip end.

5. The system according to claim 1,
wherein the work success/failure judging unit judges whether the work is successful or failed based on whether a difference between an ideal contact position known in advance and the calculated contact position is within a predetermined threshold value.

6. The system according to claim 1,
wherein the predetermined positions are equal to at least two in number, and
wherein the work success/failure judging unit judges whether the work is successful or failed based on whether relative positional relationship between the contact position calculated for one of the predetermined positions and the contact position calculated for the other one is within predetermined positional relationship.

7. The system according to claim 1, further comprising:
an external force monitoring unit that monitors a value of the external force and transmits a signal indicating detection of a contact to the position command generating unit when the value of the external force exceeds a predetermined threshold value,
wherein the position command generating unit generates a position command enabling decelerating and stopping of the robot in response to reception of the signal.

8. The system according to claim 3, further comprising:
a fingertip position calculating unit that calculates the position of the tip end by calculating a position of the fingertip by sequentially transforming values of encoders installed to respective shafts of the robot, calculating a center position of the sphere-shaped tip end portion by adding the dimension of the position and posture detecting unit to the position of the fingertip, and adding a radius of the tip end portion to the center position in accordance with an approach direction of the position and posture detecting unit with respect to the predetermined position.

9. A system for judging success or failure of a work of a robot, the system comprising:
a position command generating means that generates a position command enabling movement of a fingertip of the robot so that a position and posture detecting means, which is attached to the fingertip of the robot and has an elastic transformation area, is brought into contact with a predetermined position relating to a work target after the predetermined work is performed for the work target by the robot;
a contact position detecting means that calculates a contact position that is a position of a tip end of the position and posture detecting means at the time of being in contact with the predetermined position based on a value of an external force applied to the fingertip and the position of the tip end of the position and posture detecting means; and
a work success/failure judging means that judges the predetermined work to be successful when the calculated contact position is within a predetermined range and judges the predetermined work to be failed when the calculated contact position is not within the predetermined range.

10. A method of judging success or failure of a work of a robot, the method comprising:
generating a position command enabling movement of a fingertip of the robot so that a position and posture detecting unit, which is attached to the fingertip of the robot and has an elastic transformation area, is brought into contact with a predetermined position relating to a work target after the predetermined work is performed for the work target by the robot;
calculating a contact position that is a position of a tip end of the position and posture detecting unit at the time of being in contact with the predetermined position based on a value of an external force applied to the fingertip and the position of the tip end of the position and posture detecting unit; and
judging the predetermined work to be successful when the calculated contact position is within a predetermined range and to be failed when the calculated contact position is not within the predetermined range.

* * * * *